Sept. 24, 1929.   J. C. SHANNON   1,729,132
SEMIAUTOMATIC BLEEDER VALVE CONTROL
Filed April 30, 1928
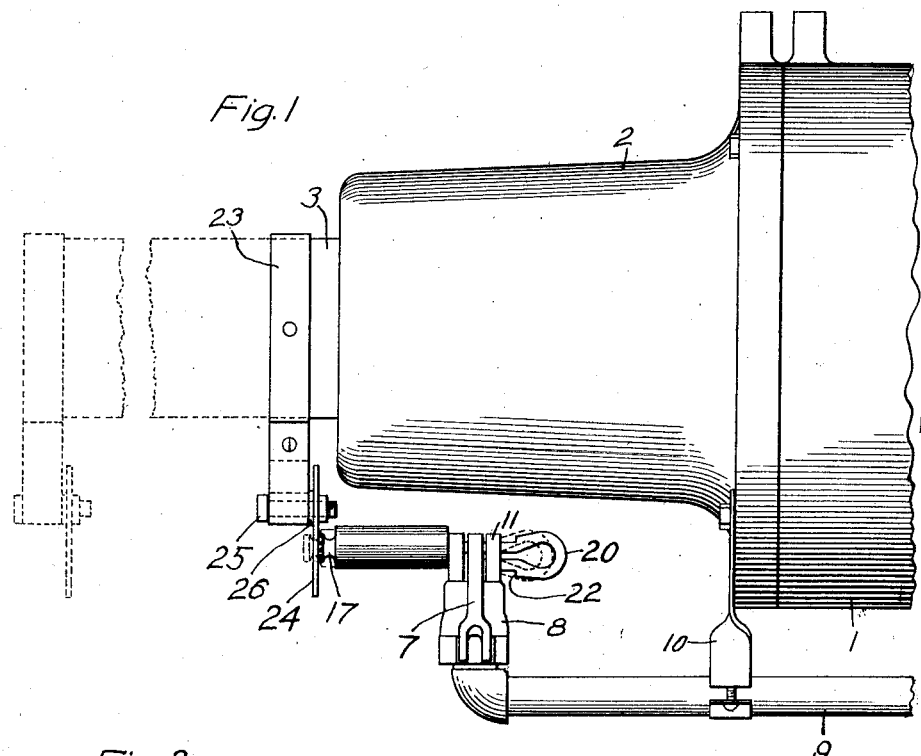
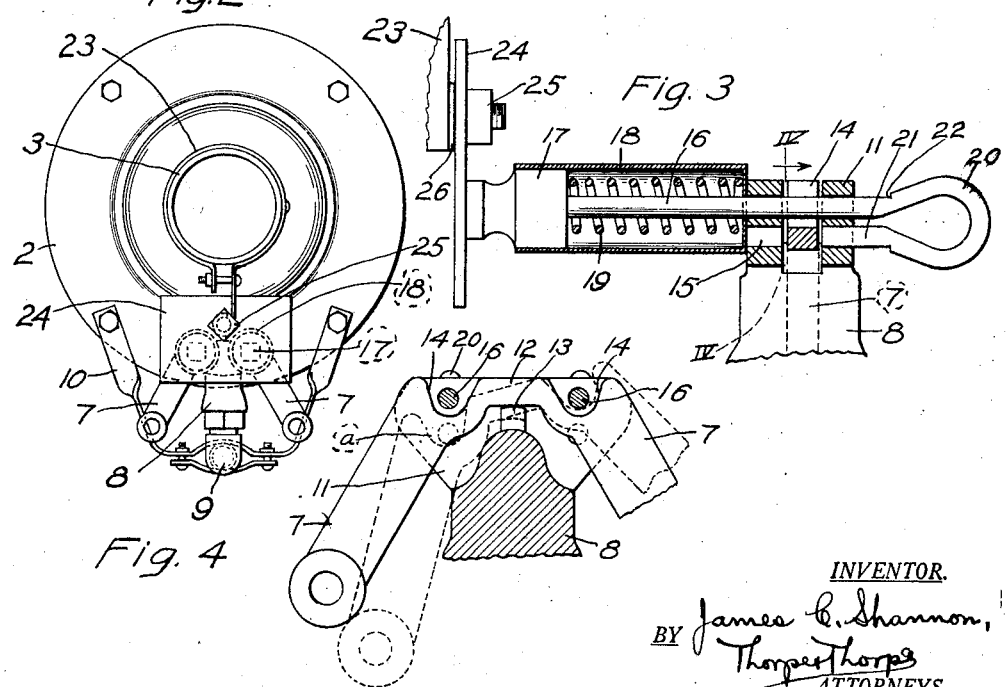
INVENTOR.
BY James C. Shannon,
Thorpe&Thorpe
ATTORNEYS.

Patented Sept. 24, 1929

1,729,132

UNITED STATES PATENT OFFICE

JAMES C. SHANNON, OF KANSAS CITY, KANSAS

SEMIAUTOMATIC BLEEDER-VALVE CONTROL

Application filed April 30, 1928. Serial No. 273,989.

This invention relates to semi-automatic means to insure the complete bleeding of air brake reservoirs used in conjunction with railway car air brake cylinders, whereby upon the manual tripping of the common and ordinary bleeder valve, said valve will be automatically and securely locked in open position until the air reservoir has been entirely bled and the piston has returned to brake released position.

Under present operating methods it is necessary for a trainman to hold the bleeder valve open for a more or less long length of time to insure return of the piston to brake released position and frequently as a train starts up sticking brakes will be noticed and it is necessary for a trainman to run along beside the car and hold the bleeder valve open. Thus a great deal of time is lost and the trainmen are more or less prone to hold a valve open an insufficient length of time to insure complete bleeding. Devices have heretofore been produced to remedy the above operating conditions, but as far as I am aware no device has yet fulfilled all of the requirements for a commercially practical construction.

A still further object of the invention is to provide a bleeder valve locking mechanism which is of strong, durable, efficient and inexpensive construction and which does not require special valves, auxiliary air cylinders or peculiarly delicate or expensive mechanism; and in order that it may be fully understood, reference is to be had to the accompanying drawing, in which:

Figure 1 is a side elevation of the end of a non-pressure head and piston valve equipped with a common and ordinary bleeder valve connected to the air reservoir (not shown) and having the locking mechanism of the invention.

Figure 2 is a reduced end view of the device as shown in Figure 1.

Figure 3 is an enlarged central vertical section through the locking mechanism of the invention.

Figure 4 is a section on the line IV—IV of Figure 3.

In the said drawing, where like reference characters identify corresponding parts in all of the Figures, 1 indicates the air brake cylinder, 2 the non-pressure head, and 3 the air brake piston rod which reciprocates through the non-pressure head, being moved outwardly by air pressure to set the brakes and returning to normal position under the impetus of the return spring (not shown).

After brakes on freight trains have been set and there is insufficient pressure in the train line to effect operation of the triple valves for the release of the brakes, it is consequently necessary for the trainmen to walk the length of the train and push or pull on rods secured to the operating arms 7 of the bleeder valves 8 carried by the air reservoirs holding air under pressure and consequently maintaining the brakes applied to the wheels. As before stated this method of operation takes a great deal of time as some of the reservoirs will bleed very slowly and trainmen will not always hold the valve open for a sufficient period of time to insure return of the piston to brake off position.

In order therefore to provide means to lock the bleeder valve open until the piston has returned to normal position, 9 indicates an air pipe tapped into the hole in the air reservoir where the bleeder valve is normally situated, said pipe extending toward the non-pressure head and being preferably suspended from said head by a clamp bracket 10.

The bleeder valve 8 of any common or preferred standard construction is threaded in the end of said pipe and is spaced from the non-pressure head such a distance that it may be readily removed from or placed in position without unscrewing the pipe.

The standard bleeder valve terminates at its upper end in a forked head 11 between which the operating levers 7 oscillate, the connecting portion 12 of the levers loosely riding on the extremity of the valve stem 13, said portion 12 also being provided with a pair of recesses 14 which upon a pull of one lever 7 or a push on the other lever 7, causes the portion 12 to rock on the stem 13 until the corresponding recess 14 abuts one of a pair of fulcrum rivets extending transversely of the bifurcated head of the bleeder valve, at which time continued movement of the lever 7 effects repression of the valve stem 13 and the consequent opening of the valve. As soon as the lever is released the valve returns to closed position.

In the construction, as illustrated, the customary rivets in the head are removed to provide a pair of alined upper openings through the bleeder head, and a pair of additional alined openings 15 are bored through said head at a point slightly below the upper openings as illustrated. It is to be here remarked that said lower openings 15 must be placed so that their lower margins will aline with a recess 14 in the operating levers when the strap 12 has been rocked to the dotted line position shown in Figure 4.

The locking device of the invention comprises a rod 16 extending through the upper or customary rivet carrying opening in the head of the bleeder valve, said rod at one end projecting toward the end of the non-pressure head and being fitted with a pressure foot or shoe 17 at said end. The pressure foot 17 is slidingly mounted within a tubular casing 18 carrying an expansion spring 19 tending to project the pressure foot from the housing as will be readily apparent.

The other end of the rod 16 is formed with a circular bend or loop 20 and terminates in a straight end 21 slidingly received within the opening 15 in the head of the bleeder valve. With the above construction, it will be evident that upon the rocking of the strap 12 to the dotted line position shown in Figure 4, the end 21 will immediately enter into the recess "a" Figure 4, under the impetus of the spring 19. A pair of stop shoulders 22 are formed on the loop 20 to prevent the end 21 from entering the opening 15 on the opposite side of the head where it might become wedged into position, it being also desirable to point out that the loop shape of the head is preferable as each reciprocation of the rod will tend to effect the shearing of dust or dirt into the loop and prevent it from piling up and interfering with the proper operation of the rod.

From the above it will be evident that upon operation of either lever 7, the bleeder valve will be automatically locked in open position.

In order to provide means to return and retain the locking mechanism in unlocked position, the end of the piston rod adjacent the non-pressure head is encircled by a clamp collar 23 carrying an operating plate 24 at its lower end of such dimension as to insure continuous contact with the pair of projecing shoes 17. The plate 24 is adjusted on a bolt 25 by means of washers or shims 26, until, with the piston fully in released position and held by the piston spring, the plate will maintain the rods 16 in the positions shown in Figure 3, that is with the ends 21 flush with the faces of their openings, so that a car inspector or the like may know the bleeder valves are fully seated through the looseness of the operating arms 7 as is now common practice.

It will thus be evident that I have provided simple mechanism which will automatically lock a bleeder valve in open position until the piston has returned to normal position and effected the return of the locking means. It is believed the construction and mode of operation has been so set forth that recapitulation thereof is unnecessary.

From the above description it will be apparent that I have produced a device embodying the features of advantage set forth as desirable in the statement of the objects of the invention, and which is susceptible of modification in minor particulars without departing from the principle and scope of the appended claims.

I claim:

1. A locking device for bleeder valves comprising in combination with an air brake piston rod, a bleeder valve, a slotted operating lever for said valve, a pin for engaging the slot when the operating lever is in operated position, means to move the pin into engaged position, and means operating in conjunction with the air brake piston rod for holding said pin against operation.

2. The combination with a bleeder valve and air brake piston rod, an operating lever for said valve formed with a pair of slots, a pair of fulcrum pins each cooperating with one of said slots in effecting operation of the valve, means for simultaneously cooperating with the other slot in locking the lever in operative position, and means cooperating with the piston rod in unlocking said locking means.

3. The combination with a bleeder valve and air brake piston rod, an operating lever for said valve formed with a pair of slots, a pair of U-shaped members, each having one leg extending through a slot in the lever, the non-fulcrum forming leg of each member being capable of locking the lever in open position when the fulcrum leg of the other member is in operation, and means cooperating with the piston rod in unlocking the locking member.

4. The combination with a bleeder valve and air brake piston rod, an operating lever for said valve, a fulcrum pin for said lever, a locking pin slidably mounted in the bleeder valve transversely of the plane of operation of the lever, and means cooperating with the piston rod in effecting unlocking movement of said locking pin.

5. The combination with a bleeder valve and air brake piston rod, an operating lever for said valve formed with a pair of slots, a pair of fulcrum pins each cooperating with one of said slots in effecting operation of the valve, locking pins mounted in the bleeder valve transversely of the plane of operation of the lever and adapted to cooperate with a slot in locking the lever in operative position, and means cooperating with the piston rod in unlocking the locking pin.

In testimony whereof I affix my signature.

JAMES C. SHANNON.